United States Patent [19]

Hayashi et al.

[11] 4,444,300
[45] Apr. 24, 1984

[54] VISCOUS FLUID COUPLING DEVICE

[75] Inventors: Masaharu Hayashi; Makoto Nakagawa, both of Aichi, Japan

[73] Assignee: Aisin Seiki Kabushiki Kaisha, Kariya, Japan

[21] Appl. No.: 306,617

[22] Filed: Sep. 28, 1981

[30] Foreign Application Priority Data

Oct. 9, 1980 [JP] Japan .................. 55-141402

[51] Int. Cl.³ .......................................... F16D 35/00
[52] U.S. Cl. ............................ 192/58 B; 192/82 T
[58] Field of Search ...................... 192/58 B, 82 T; 277/180, 167.5, 177

[56] References Cited

U.S. PATENT DOCUMENTS

| | | | |
|---|---|---|---|
| 3,155,209 | 11/1964 | Weir | 192/82 T X |
| 3,185,273 | 5/1965 | Smirl | 192/3.3 |
| 3,587,800 | 6/1971 | Crawford | 192/58 B |
| 3,635,480 | 1/1972 | Bain et al. | 277/180 |
| 3,841,451 | 10/1974 | Saylor et al. | 192/58 B |
| 3,902,726 | 9/1975 | Hisada | 277/167.5 X |
| 3,990,556 | 11/1976 | Hayashi et al. | 192/58 B |
| 4,181,205 | 1/1980 | Mennucci et al. | 192/58 B |

OTHER PUBLICATIONS

"Sealing cover Plates that Position Internal Parts," *Automotive Industries*, 4/15/49, p. 59.

Primary Examiner—Rodney H. Bonck
Assistant Examiner—James J. Merek
Attorney, Agent, or Firm—Sughrue, Mion, Zinn, Macpeak & Seas

[57] ABSTRACT

A viscous fluid coupling device of the type having an input member secured to a shaft for rotation therewith, an output member journaled on said shaft, a casing secured to said output member to define a housing and a partition plate for dividing said housing into a reservoir chamber and a working chamber containing said rotor is provided with a gasket carried by an interior shoulder on the output member for engagement with the outer edge of the partition plate to clamp the partition plate against the casing under pressure when said casing is secured against said output member.

2 Claims, 2 Drawing Figures

VISCOUS FLUID COUPLING DEVICE

BACKGROUND OF THE INVENTION

The present invention is directed to a viscous fluid coupling device for use in motor vehicles and more particularly to a viscous fluid coupling device for driving an engine cooling fan assembly. Many prior art viscous fluid coupling devices are comprised of a rotor fixed for rotation on an engine driven shaft and a fan carrying housing surrounding the rotor and journaled for rotation relative to the shaft. The interior of the housing is generally divided into a working chamber containing the rotor and a reservoir chamber by means of a partition plate having one or more passages therethrough which are controlled by a thermostatically operated valve plate.

An example of such a viscous fluid coupling is disclosed in U.S. Pat. No. 3,990,556 granted Nov. 9, 1976 to Hayashi et al. In this patent, the partition plate which defines the reservoir chamber and the working chamber is secured at the outer periphery thereof to an inside shoulder of the housing by means of swaging. In such a swaging operation, a portion of the metallic shoulder is rolled over the outer peripheral edge of the partition plate to secure the partition plate to the housing. Such a swaging operation requires special machinery and involves a very difficult and complicated operation within the narrow confines of the housing.

SUMMARY OF THE INVENTION

The present invention provides a new and improved viscous fluid coupling device which overcomes the constructional difficulties and disadvantages associated with conventional viscous fluid coupling devices such as described above.

The present invention provides a new and improved viscous fluid coupling device which is low in cost and simple in construction.

The present invention provides a new and improved viscous fluid coupling device wherein the partition plate is secured within the housing in a manner which eliminates the need for a swaging operation. The housing is comprised of an output member and a casing which are secured together with the partition plate therebetween to define a working chamber and the reservoir chamber. The partition plate is sealingly secured at its outer peripheral edge to the casing by means of a gasket carried by and protruding axially beyond an interior shoulder on the output member.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
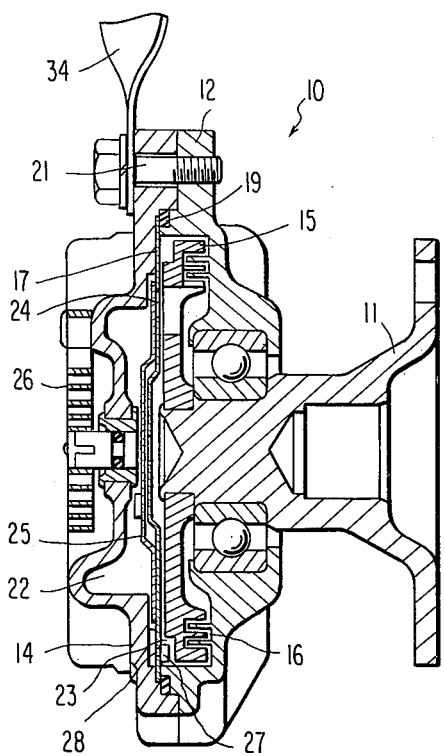
FIG. 1 is a vertical longitudinal sectional view of a viscous fluid coupling device according to the present invention.

The viscous fluid coupling device 10 includes an input shaft adapted to be driven by an engine of a vehicle, an output member 12 and a casing 14 sealingly secured to the output member. A fan assembly 34 is fixed to the casing 14 for unitary rotation therewith. An input disc or rotor 15 is secured to the end of the shaft 11 for rotation within the housing defined by the output member and casing.

A plurality of axially extending annular grooves and flanges 16 are provided on the opposing faces of the rotor 15 and output member 12 to transmit rotational torque from the rotor 15 to the output member 12 upon rotation of the shaft 11 in the presence of a viscous fluid.

A partition plate 17 is disposed against the inside shoulder 18 of the casing 14 to divide the interior of the housing into a reservoir chamber 22 and a working chamber 23. The outer peripheral edge of the partition plate 17 is sealing secured to the casing 14 by means of a gasket 19 disposed between the casing 14, the outer peripheral edge of the partition plate 17 and an inside shoulder 20 of the output member 12 when the casing 14 is clamped to the output member 12 by means of bolts 21. Since the gasket 19 has a thickness H and is installed on the shoulder 20 having a depth h which is smaller than the thickness H, the gasket 19 will extend beyond the end of the shoulder 20 by a distance t.

Figure 2:
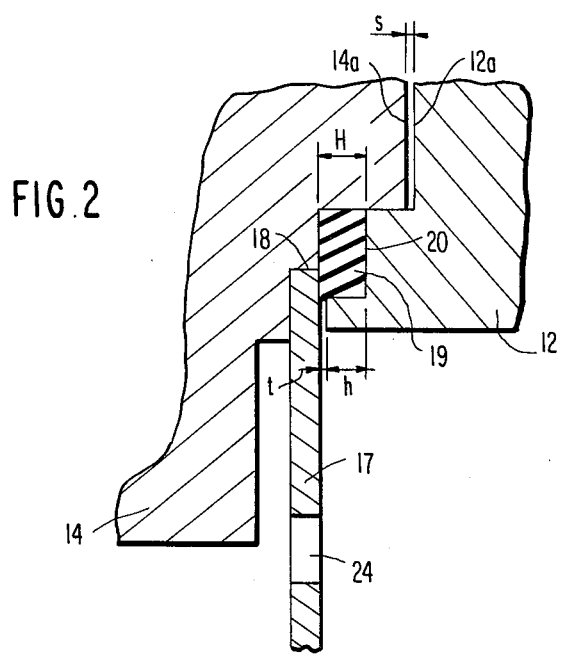
FIG. 2 is a partial, enlarged view similar to FIG. 1 showing the arrangement for securing the partition plate.

The distance t is equal to the distance s between the portions 14a and 12a of the casing 14 and output member 12, respectively, as seen in FIG. 2, prior to tightening of the bolts 21 to secure the casing and output member in contact with each other. Thus, when the casing 14 and output member 12 are clamped against each other by means of the bolts 21 considerable surface pressure will be generated on the gasket 19 to compress the same and tightly secure the partition plate in place.

A slot 24 is provided through the partition plate 17 to allow fluid flow from the reservoir chamber 22 to the working chamber 23. The fluid flow from the working chamber 23 to the reservoir chamber 22 is accomplished by a pumping element 27 which is provided on the partition plate and which projects toward the working chamber 23. The fluid moved by the pumping element 27 can then enter the reservoir chamber through the passage 28 provided in the partition plate. The slot 24 through the partition plate 17 can be opened or closed by means of an angularly displaceable arm 25 which is mechanically connected to a temperature responsive member such as a bimetallic coil 26.

While the invention has been particularly shown and described with reference to a preferred embodiment thereof, it will be understood by those in the art that various changes in form and details may be made therein without departing from the spirit and scope of the invention.

What is claimed is:

1. A viscous fluid coupling device comprising an input shaft, a rotor secured to said input shaft, an output member journaled on said shaft and a casing sealingly connected to said output member to define a fluid housing, a partition member dividing said housing into a reservoir chamber and a working chamber with said rotor being disposed in said working chamber, passage means communicating said reservoir chamber with said working chamber, gasket means between said output member, said casing and said partition plate for clamping said partition plate against said casing under pressure upon securement of said casing against said output member and shoulder means on said output member within said housing for supporting said gasket means with the depth of said shoulder means being smaller than the thickness of said gasket means whereby said gasket means will be compressed upon clamping said casing means to said output means, and wherein said gasket means is comprised of a ring of elastomeric material having a rectilinear cross-section with one axially directed face thereof bearing against said output member and the other axially directed face thereof bearing against said casing means and said partition member.

2. A viscous fluid coupling device as set forth in claim 1 wherein said gasket means is a single gasket which extends beyond said shoulder a first distance equal to a second distance which exists between said casing means and said output means when assembled prior to compressing said gasket means.

* * * * *